United States Patent [19]
Hadden

[11] Patent Number: 5,501,343
[45] Date of Patent: Mar. 26, 1996

[54] SOIL FEEDING APPARATUS WITH INTERRUPTOR AND METHOD

[75] Inventor: Robert J. Hadden, Middleboro, Mass.

[73] Assignee: The Read Corporation, Middleboro, Mass.

[21] Appl. No.: 293,515

[22] Filed: Aug. 19, 1994

[51] Int. Cl.$^6$ ...................................................... B07B 1/00
[52] U.S. Cl. ........................................ 209/240; 209/243
[58] Field of Search .................................. 209/240–246, 209/315, 316, 420, 421, 910; 414/419, 421; 222/162, 164, 166, 454, 644

[56] References Cited

U.S. PATENT DOCUMENTS

| | | |
|---|---|---|
| 4,197,194 | 4/1980 | Read . |
| 4,237,000 | 12/1980 | Read et al. . |
| 4,256,572 | 3/1981 | Read . |
| 4,552,653 | 11/1985 | Sumino ..................................... 209/421 |
| 5,082,555 | 1/1992 | Read . |
| 5,100,539 | 3/1992 | Tsutsumi ................................ 209/240 |
| 5,106,490 | 4/1992 | McDonald ............................. 209/240 |
| 5,232,098 | 8/1993 | St. Pierre et al. . |
| 5,292,006 | 3/1994 | Girts, Jr. . |

Primary Examiner—D. Glenn Dayoan
Attorney, Agent, or Firm—Richard P. Crowley

[57] ABSTRACT

An improved soil feeder system in combination with a soil separating apparatus and method of controlling the feeding of soil material employing the soil feeder. The soil feeder apparatus includes a hopper body to receive soil material and an opening at one end for controlling the feeding of soil material to be screened. The body includes hydraulic cylinders at the one end to tilt the hopper body between a soil receiving position and a tilted soil discharging position. An interruption system is provided to cause a series of abrupt interruptions in the tilting of the hopper body. The interruption system includes a cycle timer which controls the period of time between the start of each interruption and an interruption timer which controls the length of time of each interruption. The interruption is caused by a sudden and temporary diversion of hydraulic fluid from the hydraulic cylinders which tilt the hopper body. The interruption imparts a thump or inertial shock to the soil on the hopper body, thereby deconsolidating the soil and allowing it to flow more consistently.

27 Claims, 12 Drawing Sheets

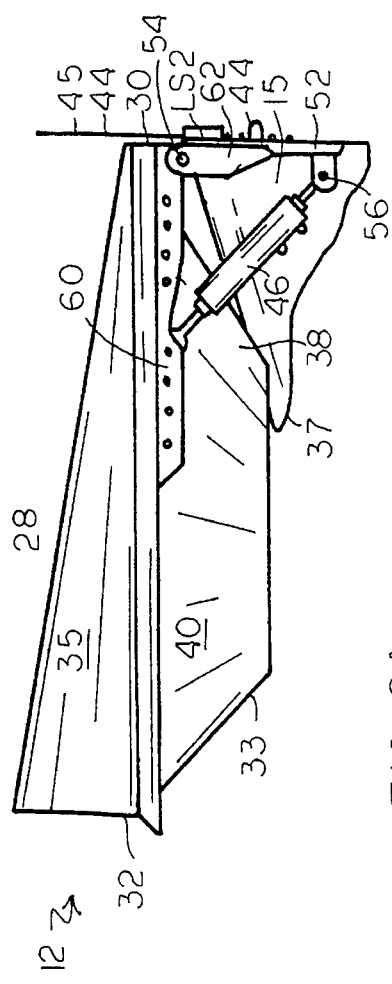
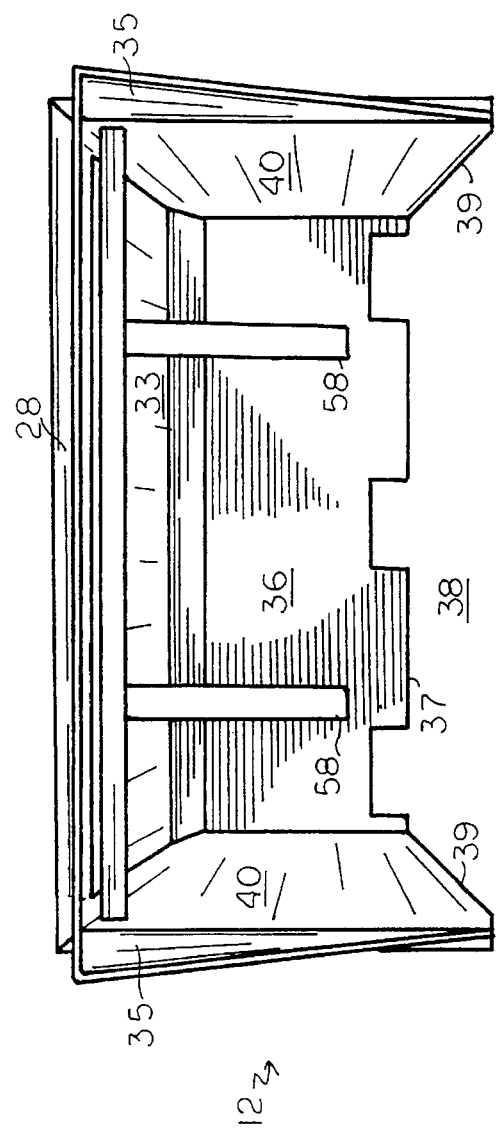

SOIL FEEDING APPARATUS WITH INTERRUPTOR AND METHOD

BACKGROUND OF THE INVENTION

In many soil separators used to screen out coarse material from finer soils, feeding of soil to be separated is accomplished by dumping the material from a shovel of an excavating vehicle onto a grate or screen of the soil separator. The separators which are involved in this invention are also used to separate various excavation and construction materials, and various waste materials, particularly land-fill waste and compost. The separating elements may be grates, screens or a series of rods, which may be cantilevered and may be moving or vibrating.

Soil separators traditionally have employed an inclined screen having a high end and a low end onto which the soil to be separated by screening is loaded gradually such that the larger rocks and aggregate roll off the low end of the screen and finer materials pass downwardly through the screen at a gradual feeding rate to prevent clogging. Improved soil separators such as "Screen All" soil separators, a registered trademark of The Read Corporation, are disclosed in U.S. Pat. Nos. 4,197,194, 4,237,000, 4,256,572, and 5,082,555 and are hereby incorporated by reference. These soil separators have a box like housing, and, in addition to an upper coarse mesh screen, employ two lower slanted screens connected to a vibrator for shaking soil material loaded on the upper screen and contained thereon for screening by side panels and a high end panel, the low end being open. The very coarse material loaded on the upper screen is screened out initially by the slanted upper coarse mesh screen. The large particles pass from the upper section of the screen downwardly along the slanted surface of the upper screen and fall off the lower end, to be collected. The less coarse material passes through the upper screen and encounters shaking action of the lower slanted screens which accelerate the process of separating, permitting a faster rate of loading, with the finer materials passing downwardly to a segregated bin under the housing, accessible for removal from the high end. Because the low end of the coarse screen is open for releasing coarse materials, it is not feasible to dump a large load of soil on the slanted screen. This is because the fine material would pass off the lower end with the coarser material and become co-mingled with the coarse soils.

The loading and feeding of the soil separators may be done by a conveyor or input hoppers, or more frequently, by dumping soil material onto the top screen, frequently positioned in a hopper, from the shovel of an excavating-type vehicle, like a front end loader. When an excavating vehicle, such as a pay loader, is employed, it is necessary to feed the soil material at a controlled rate onto the upper inclined grate, from which the soil material is funneled onto the grate by upwardly inclined side panel sections, and the high end funnel surface, which serve as a hopper. This feeding operation requires time and a certain degree of skill on the pay loader operator's part and therefore, ties up the use of very expensive equipment at considerable cost and inconvenience.

It was therefore desirable to provide for an improved and effective soil feeding mechanism, and to provide a soil feeding mechanism in combination with a soil separator to provide for a controlled rate of loading and improved separation of finer soils and to a method of feeding soils, to be separated, into a soil separator employing the improved soil feeding mechanism.

As was clearly established by the system described in the READ patent U.S. Pat. No. 5,082,555, an improvement to a material feeder system will increase the level of productivity that could be expected when using the material feeder in conjunction with a vibratory material separating apparatus. With the addition of a material feeder the desired effect is to gain benefit through improvement in the quality of separation in the product being screened as well as time savings through the utilization of the material feeder to deliver the material to the screening surface. Conventionally the material to be separated would be delivered to the vibratory material separating apparatus by way of a front end bucket type of loader which would empty its contents directly onto the screening surface. The key to the quality of the separation process and efficiency of the overall operation is tied into the rate at which the loader feeds the material onto the screening surface and how frequently the loader delivers a bucket of material to be separated. Without a material feeder the front end bucket loader would arrive at the vibratory material separating apparatus with a full bucket of unseparated material raised into a position ready to empty its contents over the screening surface. This process would require that the loader remain at the separator and gradually empty the material from the bucket onto the screening surface. The technique used and the rate at which the bucket is emptied is directly related to the composition of the material in the bucket. The object of the material feeder is to decrease the time that the loader must spend at the vibratory material separating apparatus. The time lost gradually emptying the loader bucket could be more effectively applied to the retrieval of more unseparated material. This more efficient use of time would result in more loading and unloading trips or cycles which would increase the productivity of the manpower and equipment required for the material separating process.

It was the intent of this improvement to enhance the performance of the material feeder system by facilitating the discharge of material from the bucket to the screening surface of the vibratory material separating apparatus. The benefits of using a material feeder system can be significant when compared to productivity levels achieved using the front end bucket loader as the sole means of delivering unseparated material to the screening surface. The means currently in use for creating a consistent flow of material from the feeder assembly is rotation of the feeder about an axis which gradually exposes more material to an unsupported position above the screening surface whereby gravity is allowed to pull material out of the feeder onto the screening surface for separation. This method employs a pivot point and hydraulic cylinders mounted between the feeder assembly and the vibratory material separating apparatus to achieve the rotation of the feeder. There are also other hydraulic components incorporated in the system to control the speed at which the (full) feeder assembly rotates upward or raises to empty the contents, as well as controls to regulate the speed of the (empty) feeder rotating downward to the lower "ready to receive material" position. These speed controls are located within the hydraulic control module which also features components to operate other aspects of the feeder system. The overall hydraulic system exists on the equipment as the means for operating the various functions required for a vibratory material separating apparatus. Therefore it is the most convenient method of driving any auxiliary equipment such as the material feeder system.

Other specific aspects of the material feeder system include a secondary hydraulic pump which is mounted to the primary hydraulic pump used to drive the hydraulic of the vibratory material separating apparatus. The secondary pump drives the hydraulic cylinders which are used to pivot or raise the feeder assembly to allow the unscreened material to be delivered onto the screening surface. The oil that is pumped from the secondary hydraulic pump is directed to the hydraulic control module where it is routed to either the hydraulic cylinders to raise the feeder assembly or back to the hydraulic oil reservoir when no cycle start signal has been received. The secondary hydraulic pump is sized based upon the requirements of the hydraulic cylinders to lift the feeder assembly when it is at its maximum weight capacity of unscreened material. Within this module there is an electrical solenoid which acts as a gate for routing the oil to either of its destinations. The solenoid receives its instructions from an electrical control panel which contains the circuitry for starting a material feeder cycle as well as circuits for an emergency abort of a cycle which signals the electrical solenoid to divert the flow of oil from the hydraulic cylinders and route the oil back to the hydraulic reservoir.

There is also a mechanical trigger which is activated by the front end bucket loader after it empties the unseparated material into the feeder assembly. The trigger initiates the cycle through the electrical control panel which instructs the electrical solenoid in the hydraulic control module to route the oil to the hydraulic cylinders in order to pivot or raise the feeder assembly to allow the unscreened material to be delivered to the screening surface. In order to achieve the highest degree of material separation, it is important that the volume of unscreened material present on the screening surface at any given time not exceed the ability of the vibratory screening apparatus to separate that material. The method currently in use to accomplish this is the slow pivoting rotation of the full feeder assembly into the raised position. This gradual movement of the feeder assembly results in a limited degree of metered discharge of the unseparated material from the feeder assembly onto the screening surface.

This method produces unpredictable results often manifested as a clumping action where the material remains in the feeder assembly while pivoting upward until the forces of gravity on the unscreened material overcome the friction between the material and the feeder assembly which causes the contents of the feeder to empty onto the screening surface in one mass or clump. The tendency of the material to adhere to the feeder assembly and also to itself is common and due in large part to the inconsistent composition and moisture content of the unscreened material. This phenomenon which drastically reduces the efficiency of the vibratory material separating apparatus is the most significant disadvantage to using a material feeder system and therefore the problem most in need of a solution. Since an effective feeder system could offer such an increase in productivity through manpower and equipment an improvement to the method currently in use is important.

A method that has been used to overcome these problems is the installation of a hydraulically driven vibrator onto the feeder assembly. Such a system is described in U.S. Pat. No. 5,232,098, to St. Pierre et al., filed on Mar. 25, 1992, and issued on Aug. 3, 1993. However the effect of vibration on the unscreened material is often as much of a hinderance as it is a help. In an effort to move material out of the feeder assembly the vibrator also compacts or jells the material that is in the feeder which increases the tendency of the material to adhere to itself and the feeder assembly which again produces a clumping action as the unscreened material is delivered to the screening surface. Delivering a full or near full load of unscreened material onto the screening surface in one mass or clump greatly reduces the volume and quality of separated material that the vibratory material separating apparatus can process and negates any benefits that an effective material feeder system could offer. Also the additional cost in componentry and maintenance to drive and control the vibrator make its limited potential benefit a poor choice for increasing the effectiveness of a material feeder system.

It is therefore a primary purpose of the present invention to provide an improvement in a soil feeder apparatus and to a soil feeder apparatus in combination with a vibratory material separating apparatus and to a method of improving the feeding of unscreened material onto a vibratory material separating apparatus.

It is furthermore a purpose of the present invention to provide an efficient and cost effective means of discharging unscreened material from a material feeder onto the screening surface of a vibratory material separating apparatus with a method that will allow for the efficient separation of unscreened material into separate stockpiles based upon the physical size of the objects within the screened material.

SUMMARY OF THE INVENTION

The present invention is directed to an improvement in a soil feeder apparatus and to a soil feed apparatus in combination with a soil separating apparatus and to a method of improving the feeding of soil material employing the soil feeder apparatus of the invention.

This invention involves a material feeder of the type for use above an associated material separating apparatus and adapted to feed, over a time period, material onto the associated material separating apparatus, said material feeder assembly having a hopper body having a first end and a second end, said hopper body being pivotably mounted at said first end on the associated material separating apparatus and pivotable from a first material loading position, wherein the material may be loaded into said hopper body, to a second material discharging position, wherein said hopper body is angled with respect to the material separating apparatus and the associated material is discharged from said hopper body onto the associated material separating apparatus. It further includes tilting means to tilt said hopper body from said first position to said second position at a controlled angular velocity, thereby providing for the controlled feeding of the material onto the associated material separating apparatus, and to return the hopper body to the first position. It further includes an interruption means to interrupt temporarily and abruptly, at least once, the tilting of the hopper body during the time that the hopper body is moved from said first position to said second position, said interruption allowing for the discharge of the material from said hopper body onto the associated material separating apparatus.

The invention also involves a method of feeding material onto an associated material separating apparatus in a controlled manner, comprising the steps of providing a hopper body having a first end and a second end, said hopper body being pivotably mounted at said first end on the associated material separating apparatus and adapted to move between a first material loading position and a second material discharging position, then, positioning said hopper body in a first material loading position above the associated material separating apparatus, then, loading material into said hopper body, then, pivoting said hopper body between said first position and a second material discharging position, wherein said second end of said hopper body is above and spaced-apart from the associated material separating apparatus to allow the associated material to be discharged from said hopper body onto the associated material separating apparatus, including interrupting at least once abruptly and temporarily the pivoting of said hopper body as said hopper body is pivoted from said first position to said second position, said interrupting allowing for the discharge of the associated material from said hopper body onto the associated material separating apparatus.

The apparatus and method employ an interruption or thump to improve the soil feed function. An interruption system is provided to cause a series of interruptions in the tilting of the hopper body about an axis at the one end between the said generally horizontal soil material loading position above the soil separating apparatus, and the said angled soil material discharging position. The interruption system includes a cycle timer which controls the period of time between the start of each interruption. The interruption system also includes an interruption timer which controls the length of time of each interruption. In the preferred embodiment, the interruption is caused by a sudden and temporary diversion of hydraulic fluid from the hydraulic cylinder which tilts the hopper body. The interruption imparts a thump or inertial shock to the soil on the hopper body, thereby deconsolidating the soil and allowing it to flow more consistently.

The present invention comprises an improved soil feeder apparatus to be attached to a soil separating apparatus having a screen such as an angled screen, the soil feeder apparatus being positioned above the screen and adapted to feed soil material in a controlled manner into the funnel shaped intake of the soil separating apparatus. The feeding is controlled by a hydraulic system which energizes a tilting means and optionally may be regulated by a timing device which sets the time period over which the soil material is to be separated, the time period being determined by the degree of fineness of the separated material desired. The soil feed apparatus includes a hopper body with a substantially flat bottom surface, a one end and an other end, and side walls which define a space within the hopper body to receive soil material to be separated by the soil separator apparatus. The side walls each include an angled base surface extending outwardly and upwardly and including hinge members at the outer most extremities of two arms extending from the one end. This bottom surface has an opening at and adjacent the one end, the opening having a height, from the floor to the top of the side rails, generally of about six inches to about twenty four inches and extending substantially across the width of the hopper body, from the angled base surface of one wall to the angled base surface of the other wall to permit soil material to pass, at a controlled rate, through the opening and onto the input hopper mechanism to which the soil feeder apparatus is attached.

The hopper body comprises a pair of upwardly extending angled sides on opposite side walls and an upwardly extending angled transverse wall at the other end to funnel soil material downwardly and inwardly into the hopper body. The hopper body is pivotably mounted by hinge means on brackets for attachment to the high end of a soil separating apparatus having an angled screen. A pair of fluid cylinders are connected between the hopper body and the mounting bracket means attached to each side of the housing of a soil separating apparatus for tilting and lowering the hopper body between a lower loading position resting on the top screen of a soil separator and an upper soil discharge position. During tilting of the hopper body, the axis of rotation extends between a one upper hinge member and an other hinge member, mounted on a pair of bracket means used for attachment to a soil separator.

A mechanical trigger "wand" is provided for attachment on the soil separating apparatus, and positioned to detect the completion of the dumping of a load of material on the material feeder. More specifically, the trigger wand would be activated by contact with the shovel of a pay loader as the shovel is withdrawing from the feeder after the shovel has dumped the material on the feeder. The trigger is electrically connected to a hydraulic system activating the operating cycle of the tilting means for tilting and lowering the soil feeder.

The tilting means comprises a fluid cylinder such as a hydraulic cylinder connected to a hydraulic system and an electrical solenoid valve means, set to discharge fluid from the fluid cylinder at the completion of the soil discharge position to permit a rapid return of the hopper body to the general horizontal loading position. As the hopper body is increasingly raised, the remaining material discharges at a faster rate and the opening is enlarged permitting larger rocks and debris previously prevented from passing to pass through the opening and to proceed down the inclined grate, a series of cantilevered rods or large mesh screen to exit from the back of the soil separator for subsequent pickup. At the termination of the discharge cycle, the fluid is withdrawn quickly from the hydraulic cylinder by opening the solenoid valve means to return rapidly the hopper body to a generally horizontal position hereby providing automatically for effective and controlled feeding of the soil material to the soil separating apparatus.

The invention also includes a method of feeding, in a controlled manner, soil material, usually obtained from a gravel pit, from a soil feeder apparatus, more particularly a soil feeder apparatus integrated on the top of a soil separating apparatus, for example a "Screen All®" soil separator. The method comprises discharging soil material into a feed hopper body normally located above the soil receiving portion normally including an included screen, of a soil separator apparatus such as a "Screen All®" soil separator, the hopper body characterized by an opening at a one end being hingably in communication with a mounting means. The opening is normally closed when the hopper body is in the lower loading position, and located above the soil separator apparatus, for loading by a pay loader type excavating vehicle. The method includes tilting the hopper body containing a load of soil material in a controlled gradual manner to an inclined soil discharging position wherein the soil material is emptied downwardly onto the inlet screen of the soil separator, so that as the hopper body moves between the soil feeding position to the inclined soil discharge position, the opening at one end being tilted from a closed position to a inclined soil discharging position gradually increases in width to permit the gradual increase in volume and size of the soil material to be discharged onto the soil apparatus over a regulated time period. For example, the opening may extend from the one end up to 25 percent of the length of the hopper body. Normally where finer screened material is desired, the rate of tilting and associated rate of discharge is slower. The cycle times for soil feeding are variable depending on the desires of the user. For example, the cycle time for loading the hopper body varies from 1 to 15 seconds, the cycle for tilting the hopper body is from 20 seconds to 5 minutes and the return time for the hopper body varies from 10 seconds to 2 minutes.

The improvement incorporates the use of circuitry that will effect the electrical solenoid in the hydraulic control module by altering its function to achieve a different result than that which it previously produced. The effect of this circuitry will be to modify the function of the hydraulic cylinders (as they receive oil from the secondary hydraulic pump via the hydraulic control module after the cycle start signal from the mechanical trigger sets the electrical solenoid within the hydraulic control module into position to direct the flow of oil away from the hydraulic oil reservoir towards the hydraulic cylinders). The circuitry will consist of two basic features both being controlled by functions of time. The first aspect of the design is to interrupt the flow of hydraulic oil to the hydraulic cylinders for a period of time ranging from about one–two hundredth of a second to about one half second. This adjustable timer would reside in the electrical control panel and would cause the electrical solenoid in the hydraulic control module to momentarily divert the flow of oil away from the hydraulic cylinders back towards the hydraulic oil reservoir. This brief cessation of oil flow to the hydraulic cylinders would cause a "thump" in the normal pivoting or lifting cycle of the material feeder which would result, in turn, in a change in inertial forces acting upon the unscreened material within the feeder assembly causing the discharge from the material feeder of a portion of the unscreened material.

The second aspect of the design is to control the frequency of these thumps or interruptions in oil flow to the hydraulic cylinders. These thumps would typically be set to occur in the range of once every few seconds up to once every minute or so also controlled by an adjustable timer residing in the electrical control panel. The combined effect of these two aspects of this design is the gradual discharge or metered release of unscreened material onto the screening surface of a vibratory material separating apparatus which insures that a consistent and efficient material separating process is performed. During the course of one typical cycle the front end bucket loader would empty its entire contents of unscreened material into the material feeder in one motion with no delay or waiting period. Upon withdrawing from the vibratory material separating apparatus the loader bucket would activate the mechanical trigger which would initiate the sequence of events that result in the feeder apparatus being pivoted or lifted by the hydraulic cylinders. As the feeder assembly, heaped with unscreened material, begins to pivot, the angle between the floor of the feeder assembly and the screening surface gradually increase. This steeper angle of the feeder assembly floor beneath the unscreened material offers less support and allows the material to overcome the friction that holds the material in the feeder thereby creating the potential for the unscreened material to flow out of the feeder assembly onto the screening surface.

With this improved method the problems experienced due to moisture content and inconsistent composition of the unscreened material are overcome by the inertial effects caused by the interruption or thumping of the feeder by the hydraulic cylinders which occurs at a specific duration and frequency throughout the pivoting travel of the feeder assembly during each loading and unloading cycle. The result is the delivery of a portion of each load of unscreened material onto the screening surface occurring at each thump during the entire feeder travel cycle. The continuous upward rotation of the feeder in conjunction with the repeated thumping action insures that a replenished volume of unscreened material is moved towards the lip of the feeder after each thump, ready to be deposited onto the screening surface throughout the cycle. This method insures an incremental feeding of unscreened material onto the screening surface by overcoming the influence of friction and by utilizing the inertial energy present in the unscreened material in the moving feeder assembly.

This method employs components that already exist on the equipment with the exception of the two adjustable timer functions which can be present in a single time device TR-1, or can be two separate devices) and does not require other expensive or complicated hydraulic components such as vibrators or large secondary pumps (all of which require additional horsepower) or any of the additional plumbing that would be necessary. The incorporation of the two adjustable timer functions represents a minimal cost. However, the impact on the performance of a material feeder system is significant in comparison to any existing method.

The invention will be described for the purpose of illustration only in connection with certain embodiments. However, it is recognized that those persons skilled in the art may make various changes, modifications, improvements and additions on the illustrated embodiments all without departing from the spirit and scope of the invention.

BRIEF DESCRIPTION OF THE DRAWINGS

FIG. 2A is a side elevational view of the improved soil feeder apparatus of the invention as employed in FIG. 1.

FIG. 2B is a top or plan view of the improved soil feeding apparatus of the invention.

DESCRIPTION OF THE EMBODIMENTS

Figure 1:
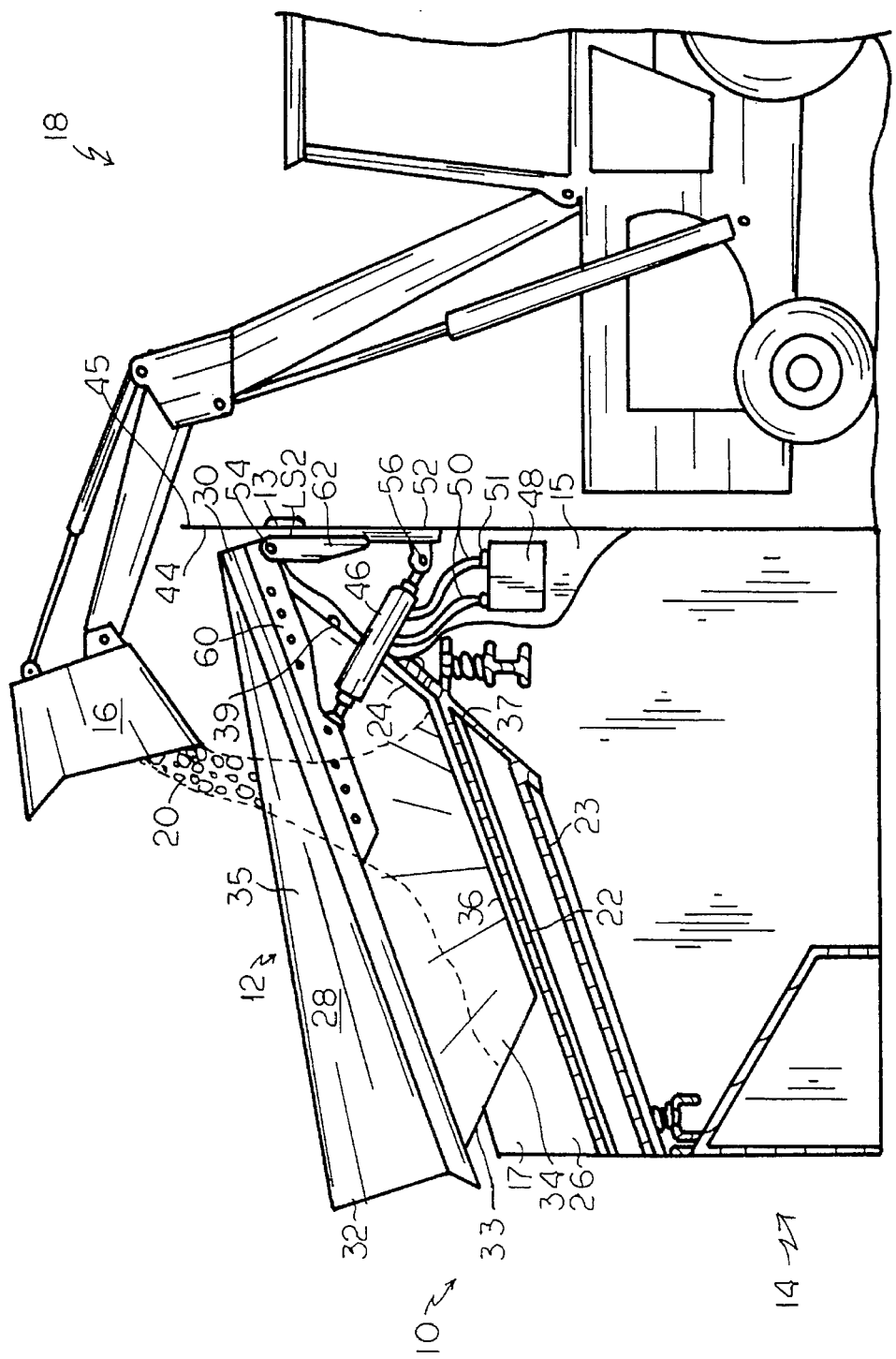
FIG. 1 is a cross-sectional elevational view of a soil feeding apparatus embodying the present invention shown attached to a soil separating apparatus shown in soil material loading position.

With reference to the drawings, FIG. 1 shows in combination a soil feeding apparatus and a soil separating apparatus 10 including a soil feeding apparatus 12, a soil separator 14, illustrated as a "Screen All" separator, having a housing 15 with a high end 13 and a lower front end 17, shown with a soil excavating vehicle (pay loader) 18 having a shovel 16 for depositing a load of soil material 20 in the soil feeder apparatus 12, shown in the lower loading position. The soil feeding apparatus 12 is positioned over a angled screen 22 being attached to housing 15 at the high end 13 by a pair of brackets 52, and comprises a hopper body 28 having a one end 30 and an other end 32, including a flat bottom surface 36 and a pair of side walls 34 with outwardly extending angled sides 35.

Figure 3:
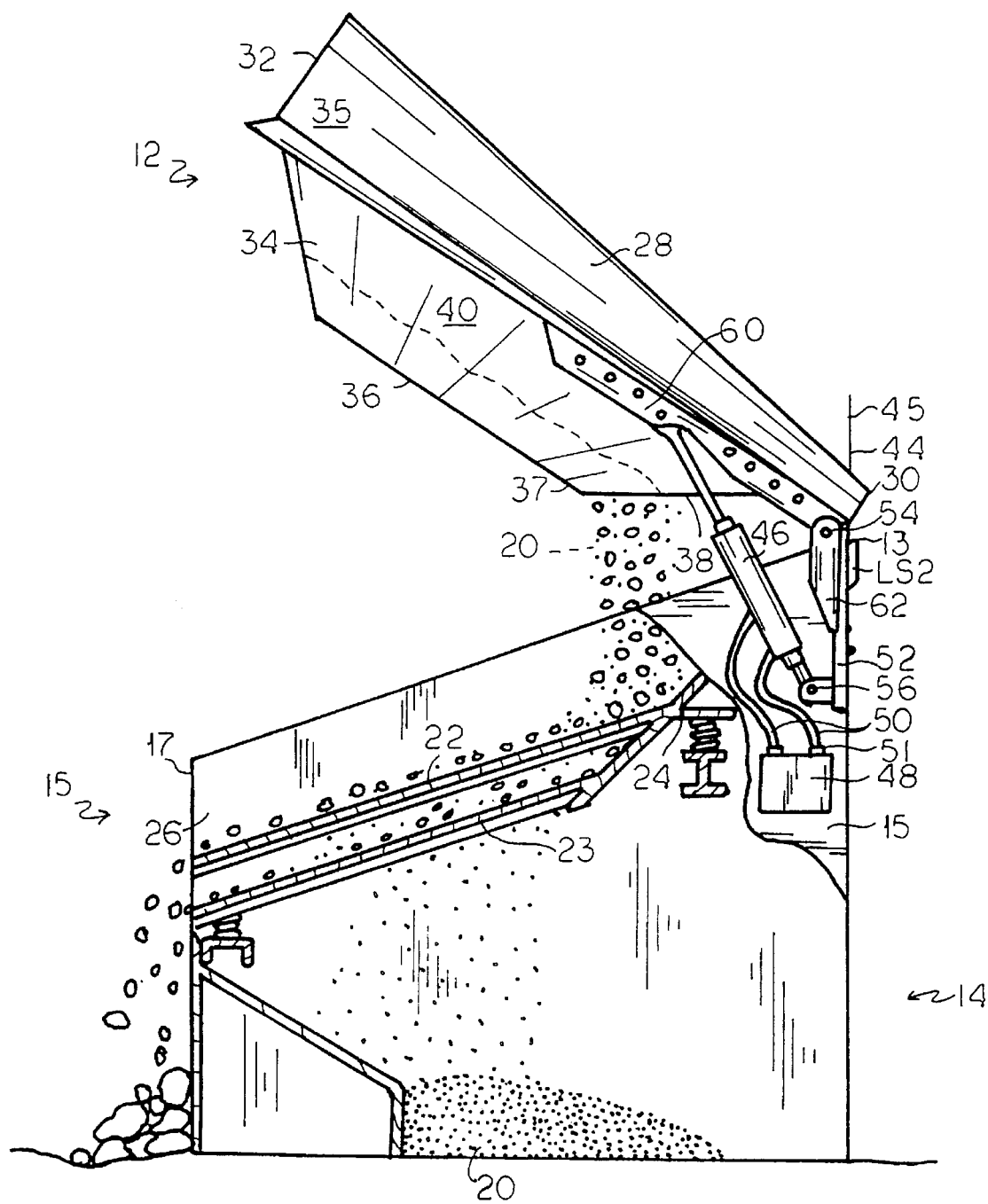
FIG. 3 is a cross-sectional elevational view of the soil feeder apparatus of FIG. 1 shown in the soil material discharging position with soil material being fed onto the upper shaker screen of the soil separating apparatus.

As shown in FIGS. 1 and 3, the housing 15 is provided with an upper angled screen 22 of coarse mesh and a lower angled screen 23 of finer mesh extending downwardly in parallel-relationship from the high end 13 to the lower front end 17, a pair of side funnel surfaces 24 extending therebetween. As shown in FIG. 3, soil material 20 is fed from the hopper body 28 when raised to the tilted discharge position by the action of hydraulic fluid cylinders 46 acting in response to hydraulic system means 48 being connected thereto by hydraulic lines 50.

As shown in FIGS. 2A and 2B, the soil feeding apparatus 12 further comprises a pair of hydraulic cylinders 46 each having a one end and an other end, the one end usually integrated with hydraulic cylinder or system of a "Screen All" soil separator, attached to a lower hinge means 56 attached to a vertically extending bracket 52 for mounting on the housing 15 (not shown in FIGS. 2A and 2B) and the other end attached to a longitudinally extending tilt bar 60. The one end of the tilt bar 60 is pivotably attached to bracket 62, part of bracket 52, secured to the soil separating apparatus to permit the hopper body 28 to pivot about on axis 54 between the generally horizontal soil material loading position (FIG. 1) and the inclined soil material discharging position (FIG. 3).

As shown in FIG. 1, soil 20 is dumped from the shovel 16 into the hopper body 28 and passes down the angled sides 35, the sidewalls 34, and the end wall 33 to accumulate on the bottom surface 36. Inasmuch as opening 38 defined by a pair of inclining side lips 39 and bottom lip 37 is closed by contact with the transverse funnel 24, soil is prevented from passing out of the hopper body.

As shown in FIG. 3, as the hopper body is tilted with the soil 20 being discharged onto the screen 22, the soil material 20 passes downwardly in sequence across screen 22 with finer and medium soils dropping through to lower screen 23 and finer soils dropping to the base of housing 15 for pickup via soil excavating front end loader. Larger rocks and material are screened out and pass out the front end 17 to accumulate in a pile for subsequent removal.

A triggering sensing means 44 is provided for attachment to the high end 13 of the housing 15 to respond to the presence of the shovel 16 of a pay loader 18. More specifically, in the preferred embodiment of this invention, the triggering means 44 includes of a normally-open wandswitch LS2, mounted on the high end 13 of the housing 15. The triggering means 44 also includes a resilient switch wand 45, which is about 36 inches long, which is mounted on switch LS2, and which extends vertically upward from the switch LS2. If the upper end of the wand 45 is moved away from the hopper body 28, the wand switch LS2 is closed. If the wand 45 is released, it is spring-biased to return to the vertical position and switch LS2 is opened. The wand is formed of an extremely durable material such as Delrin-brand polyoxymethylene (acetal) sold by DuPont Co.

In practice, the operator of a front end bucket loader would drop a load of material from the shovel 16 into the hopper body 28. Then, as the shovel 16 is withdrawn, the operator would cause the shovel 16 to hit and tilt the wand 45. This would close wand switch LS2 and thus start the tilting cycle of the material feeder.

The cycle time for loading soil material from the pay loader into the hopper body, for tilting the hopper body from the loading position upwardly to the discharge position and return of the hopper body to the loading position is variable, for example the tilting upward to the raised material discharging position time varies between 20 seconds and 5 minutes and the return down to the loading position time varies between 10 seconds and two minutes.

Figure 4:
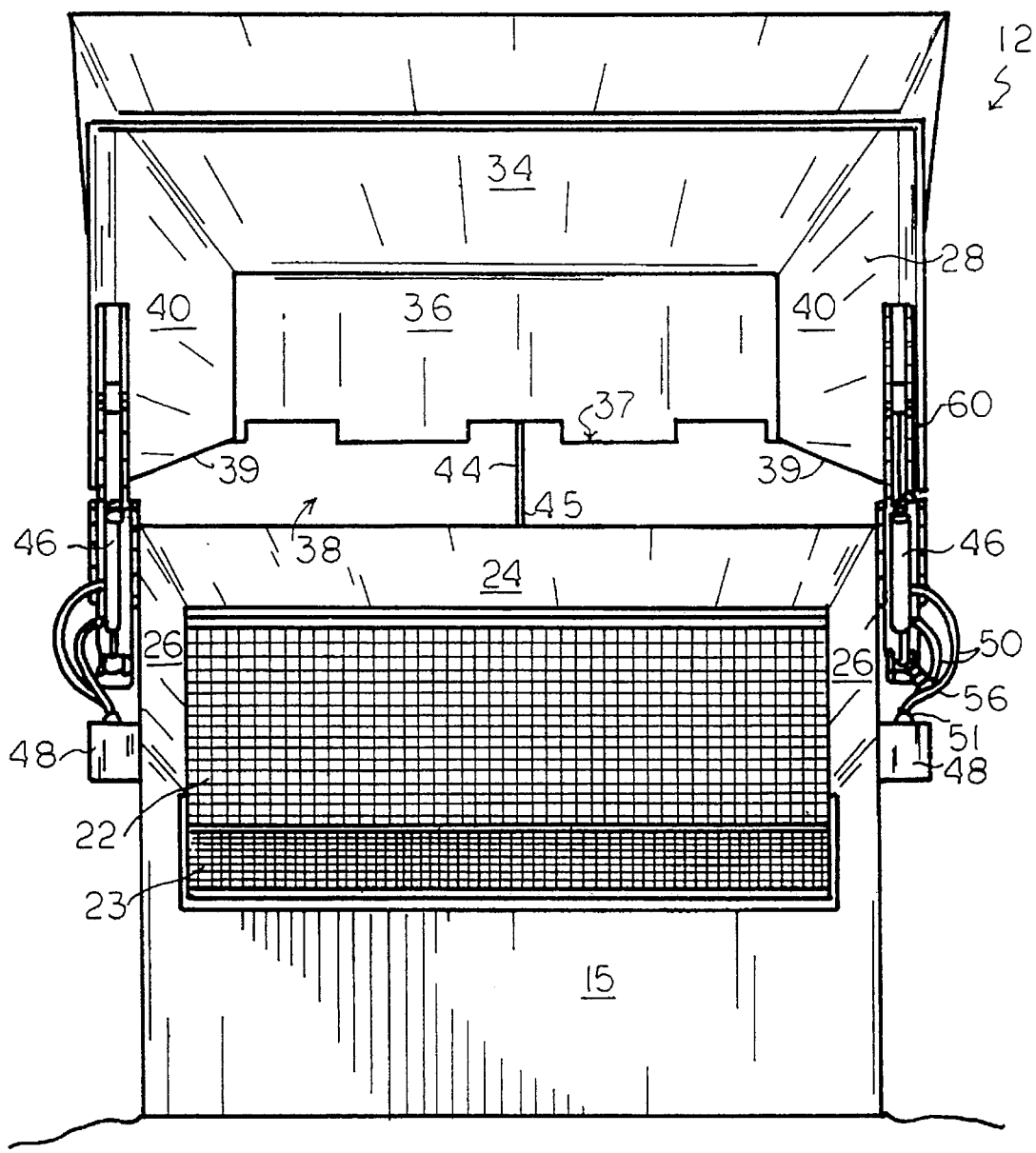
FIG. 4 is a front view of the soil feeding apparatus and soil separating apparatus of FIG. 3 and showing the soil feeding apparatus in the tilted material discharging position.
Figure 5:
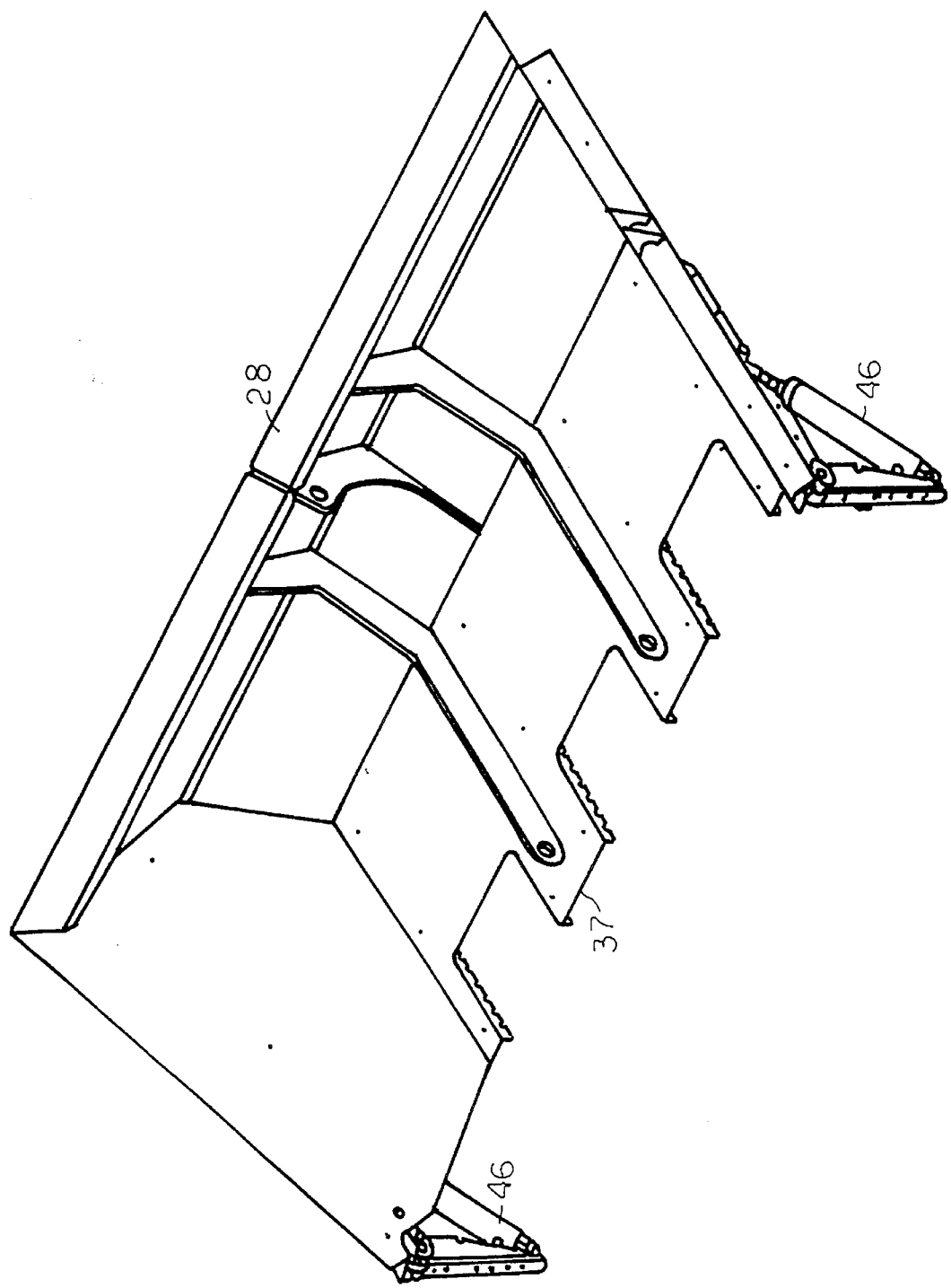
FIG. 5 is a perspective view of a variation of a hopper body embodying the present invention.
Figure 6:
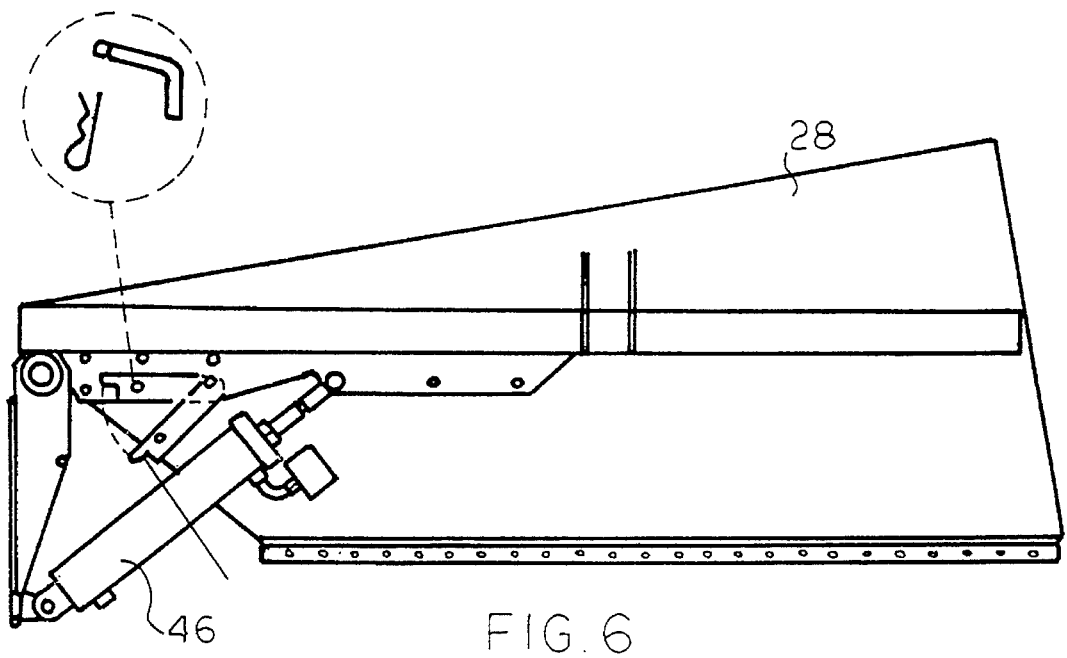
FIG. 6 is a side elevational view of the improved soil feeder apparatus of the invention in its lower position including a upper position lock in potentially active position.
Figure 7:
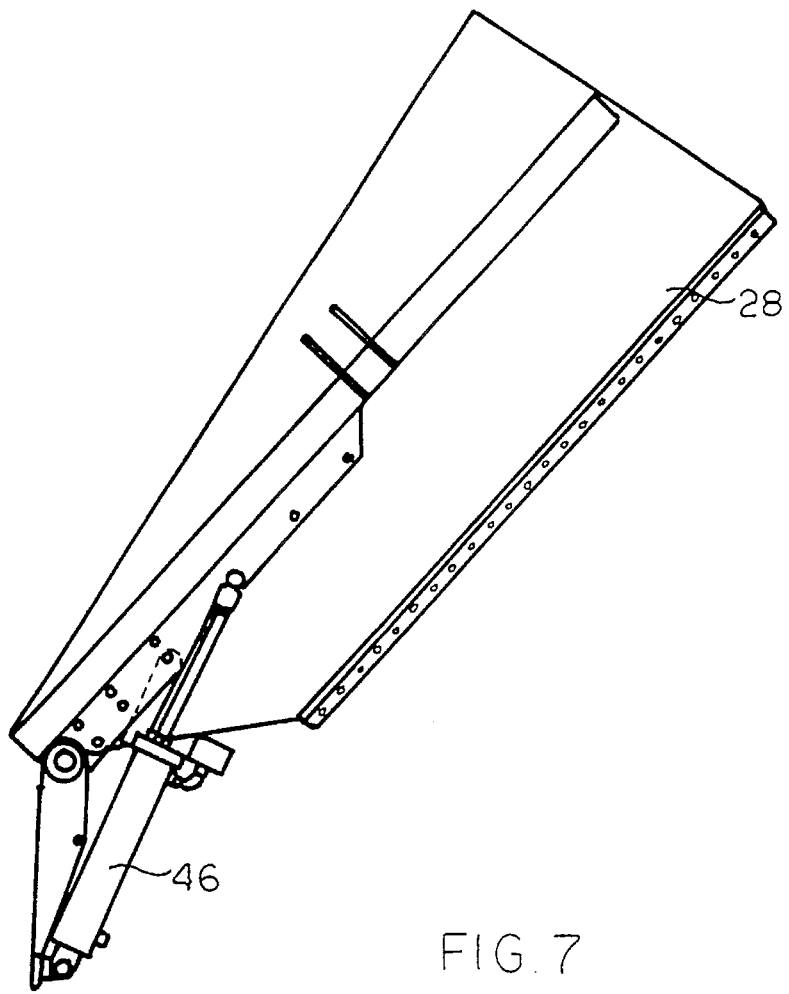
FIG. 7 is a side elevational view of the improved soil feeder apparatus of the invention in its upper position including a upper position lock in active position.
Figure 8:
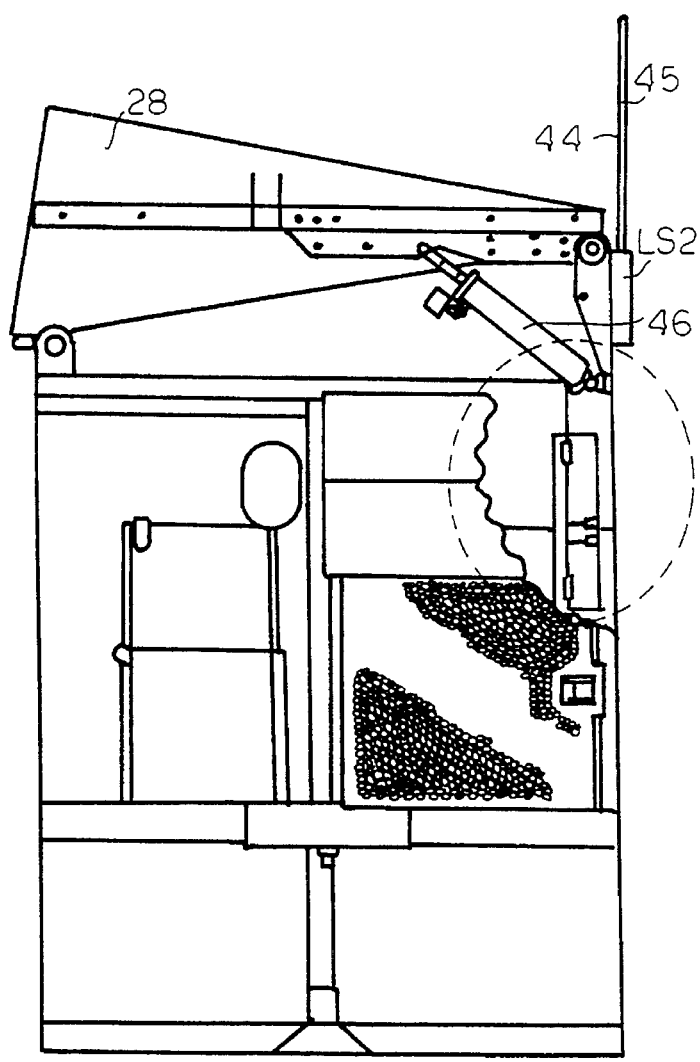
FIG. 8 is a side elevational view of the improved soil feeder apparatus of the invention in its lower position including a limit switch system for monitoring the position of the hopper body.
Figure 9:
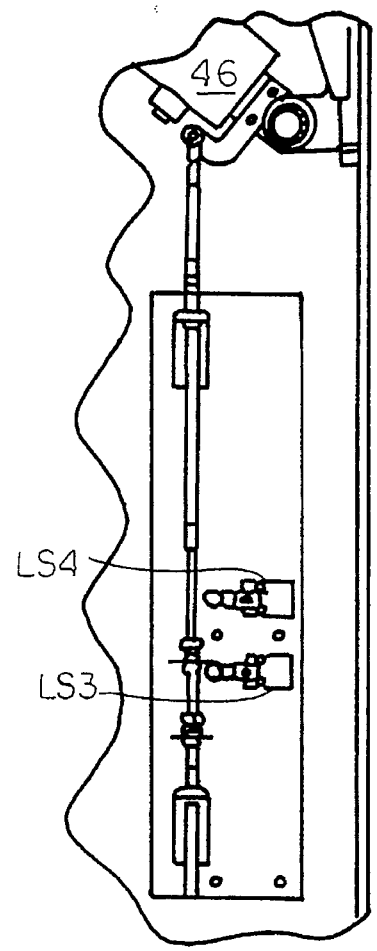
FIG. 9 is a close-up side elevational view of the improved soil feeder apparatus of the invention in its lower position including a limit switch system for monitoring the position of the hopper body.
Figure 10:
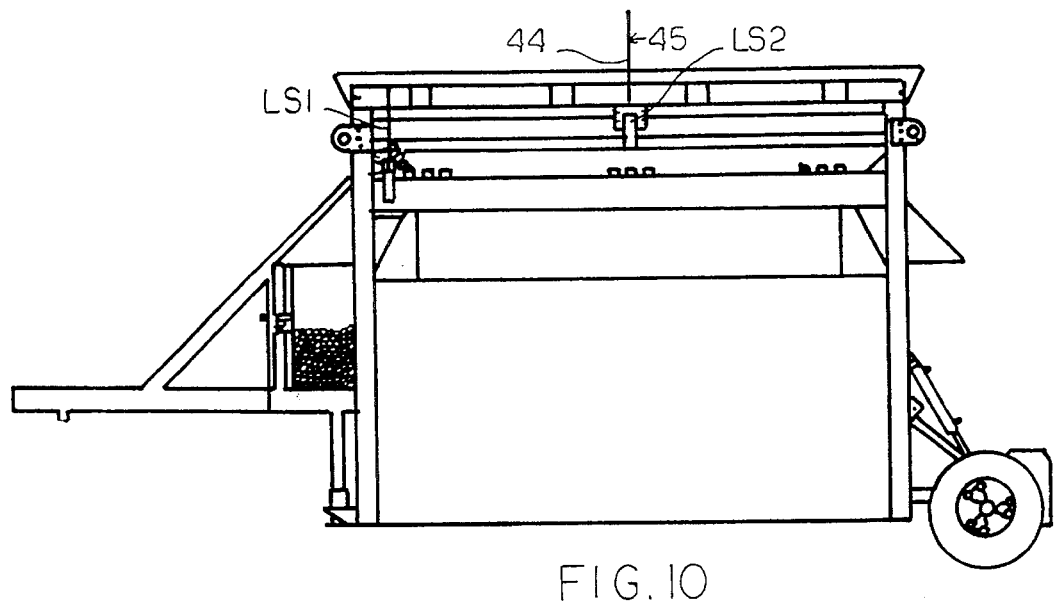
FIG. 10 is a rear elevational view of the improved soil feeder apparatus of the invention in its lower position.
Figure 11:
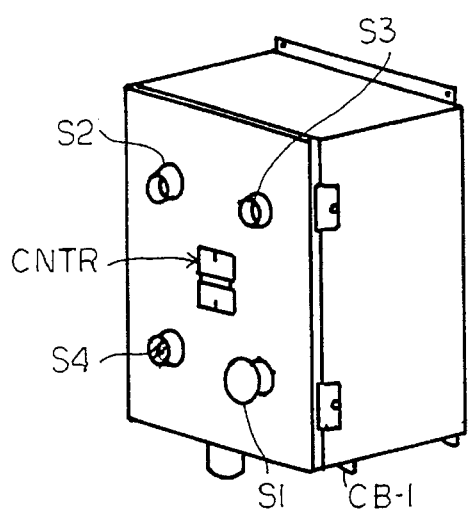
FIG. 11 is a perspective view of an electrical control panel embodying the present invention.
Figure 12:
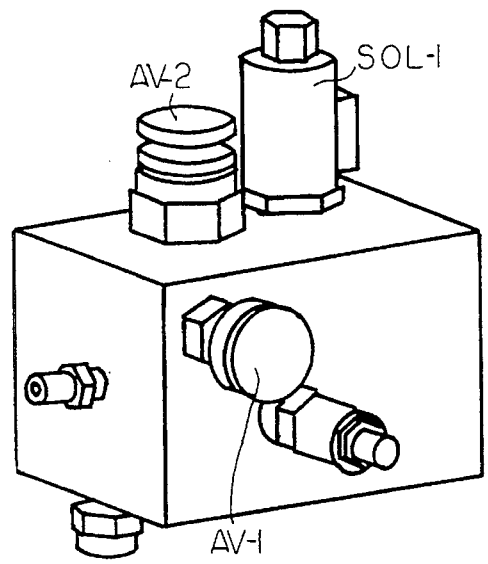
FIG. 12 is a perspective view of an hydraulic control module embodying the present invention.

Certain physical details of the preferred embodiment of the present invention are shown in FIGS. 4–10. FIG. 4 is a front elevation view of the equipment of the present invention, with the hopper body 28 in its raised, material discharging position. FIG. 5 is a perspective view of a variation of a hopper body embodying the present invention. FIG. 6 is a side elevational view of the improved soil feeder apparatus of the invention in its lower position including a upper position lock in potentially active position. FIG. 7 is a side elevational view of the improved soil feeder apparatus of the invention in its upper position including a upper position lock in active position. FIG. 8 is a side elevational view of the improved soil feeder apparatus of the invention in its lower position including a limit switch system for monitoring the position of the hopper body. FIG. 9 is a close-up side elevational view of the improved soil feeder apparatus of the invention in its lower position including a limit switch system for monitoring the position of the hopper body. FIG. 10 is a rear elevational view of the improved soil feeder apparatus of the invention in its lower position. FIG. 11 is a perspective view of an electrical control panel embodying the present invention. FIG. 12 is a perspective view of a hydraulic control module embodying the present invention.

Figure 13:
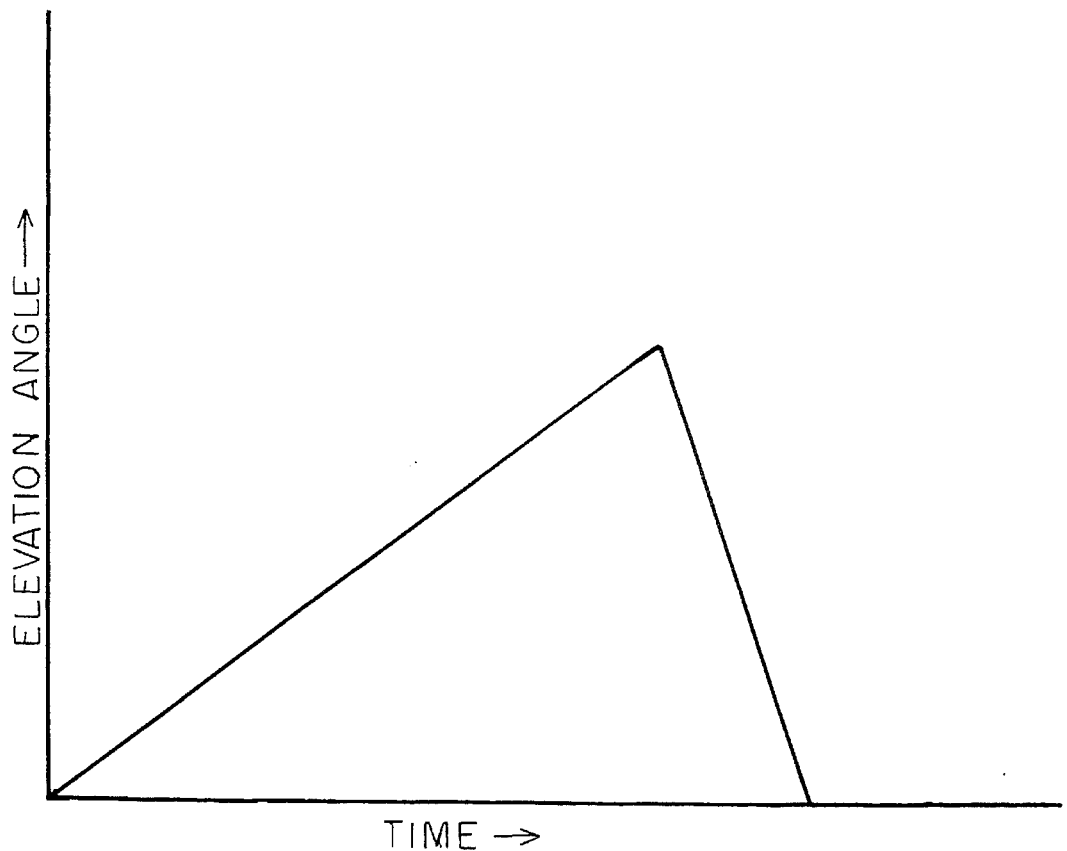
FIG. 13 is a graph showing the prior art procedure for tilting the hopper body and including no interruptions.
Figure 16:
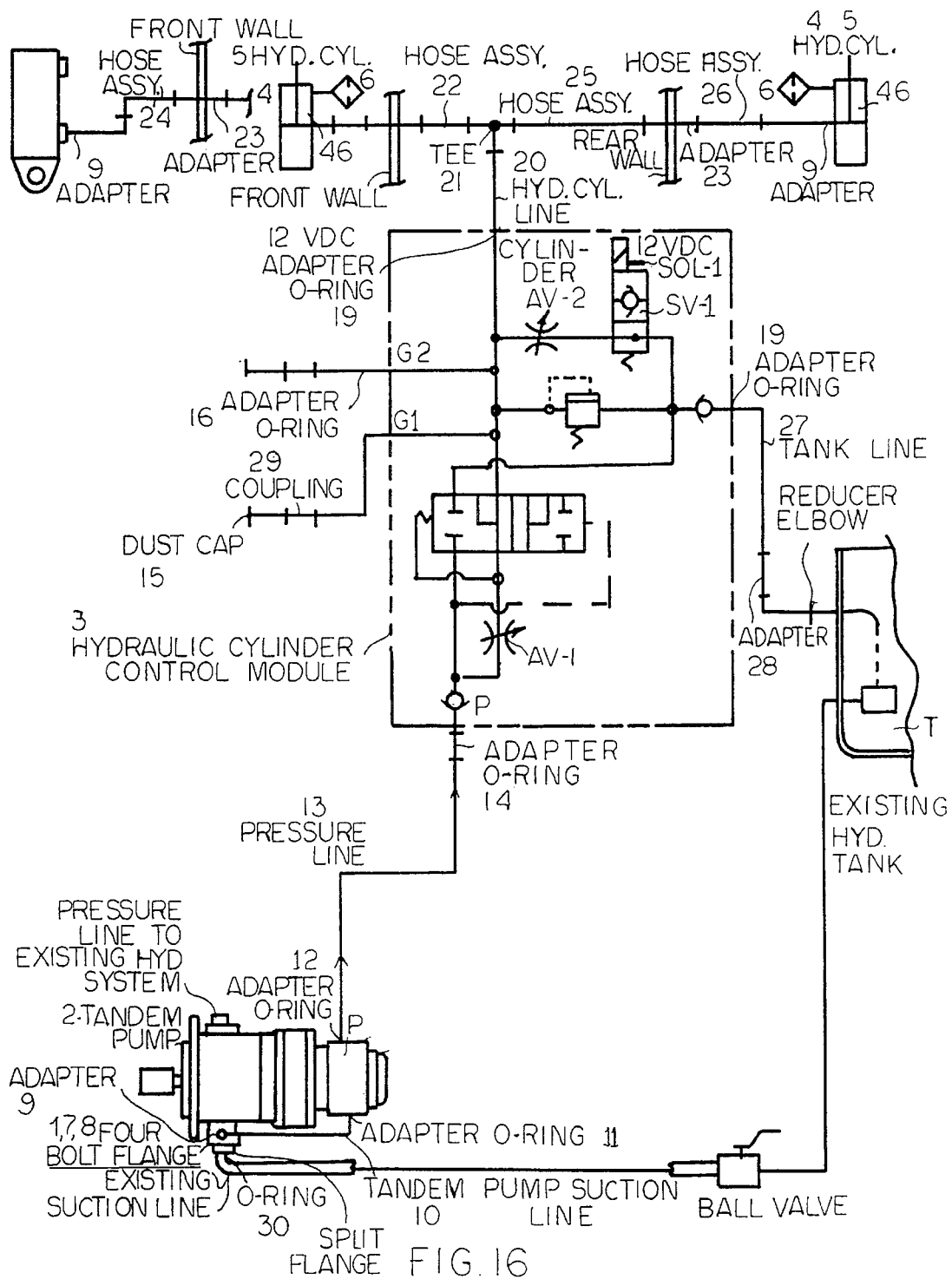
FIG. 16 is a schematic hydraulic control diagram used in the soil separating apparatus of the present invention.

The improvement which is the subject of this disclosure incorporates the use of circuitry that will effect the electrical solenoid in the hydraulic control module by altering its function to achieve a different result than that which it previously produced. Previously, the electrical solenoid allowed the flow of hydraulic fluid to the reservoir which occurred when the solenoid was deenergized. When the solenoid was energized it did not pass fluid to the reservoir, all of the fluid would go to the cylinders, and the hopper body would rise. The effect of circuitry which is the subject of the present invention will be to modify the function of the hydraulic cylinders during the time that they receive oil from the secondary hydraulic pump via the hydraulic control module. As occurred in the prior system, the dump cycle begins with the cycle start signal from the mechanical trigger setting the electrical solenoid within the hydraulic control module into position to stop directing the flow of oil to the hydraulic oil reservoir and thereby to allow all of the oil to flow towards the hydraulic cylinders. This prior operation results in a cycle shown diagrammatically in FIG. 13. Those skilled in the art will understand that the details of the motion will be far more complex than is shown in FIG. 13, but the principle is represented. The elevation cycle of the hopper body rises at a substantially-constant rate to the end of the range. This rate is controlled by an adjustable flow control valve AV-1 shown in FIG. 12 and FIG. 16. When the solenoid is deenergized, the hydraulic fluid from the pump and from the cylinders is passed through the hydraulic control module to the reservoir and the hopper body falls to its lower position. The rate of fall is controlled by an adjustable flow control valve AV-2 shown in FIG. 12 and FIG. 16. By adjusting the flow through the hydraulic control module the rate of fall or rise can be increased or decreased to best meet the requirements set by the particular separating application.

The new circuitry will consist of two basic features both being controlled by functions of time. The first aspect of the new design is to interrupt the raising of the hopper body, by interrupting the flow of hydraulic oil to the hydraulic cylinders for a period of time ranging from about one two hundredth of a second to about one half second. An adjustable timer, located in the electrical control panel, would momentarily deenergize the electrical solenoid in the hydraulic control module. This would momentarily divert the flow of oil away from the hydraulic cylinders back to the hydraulic oil reservoir. This brief cessation of oil flow to the hydraulic cylinders would cause an interruption or "thump" in the normal pivoting or lifting cycle of the material feeder which would result, in turn, in a change in inertial forces acting upon the unscreened material within the feeder assembly. The "thumping" action, which occurs when the hopper body stops or drops back slightly, as well as the momentum in the soil, continues to unweigh or lift the soil, causing the soil to deconsolidate. The deconsolidation improves the flow consistency of the soil, causing the discharge from the material feeder of a portion of the unscreened material.

The second aspect of the design is to control the frequency of these thumps or interruptions in oil flow to the hydraulic cylinders. These thumps would typically be set to occur in the range of once every few seconds up to once every minute or two. The critical issue in determining the lift time between each interruption is that the lift time be sufficient that the soil receives sufficient momentum. This momentum causes the interruption on the rise to cause the "thump" and deconsolidation in the soil. The frequency of the thumps, either by setting the time between thump starts, or by setting the time between the end of one thump and the beginning of the next thump, is also controlled by an adjustable timer residing in the electrical control panel. The combined effect of these two aspects of this design is the gradual discharge or metered release of unscreened material onto the screening surface of a vibratory material separating apparatus which insures that a consistent and efficient material separating process is performed.

Figures 14, 14A, 14B:
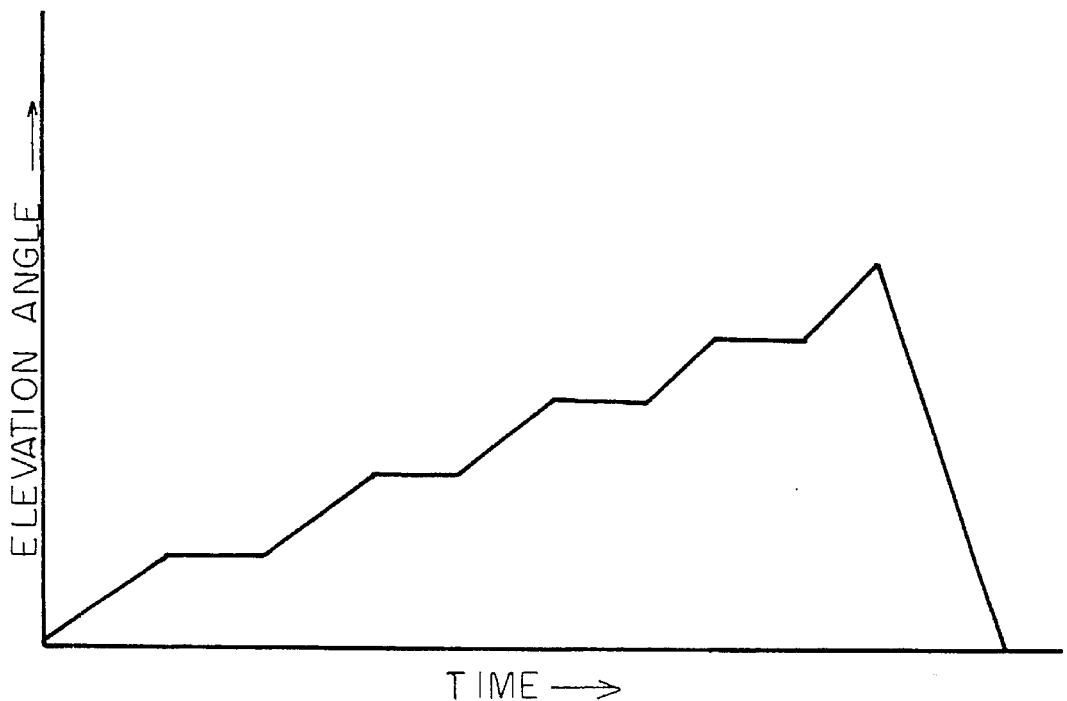
FIG. 14A is a graph showing the procedure of the present invention for tilting the hopper body and including stop-and-hold interruptions.
FIG. 14B is a graph showing the procedure of the present invention for tilting the hopper body and including dropback interruptions.
Figure 15:
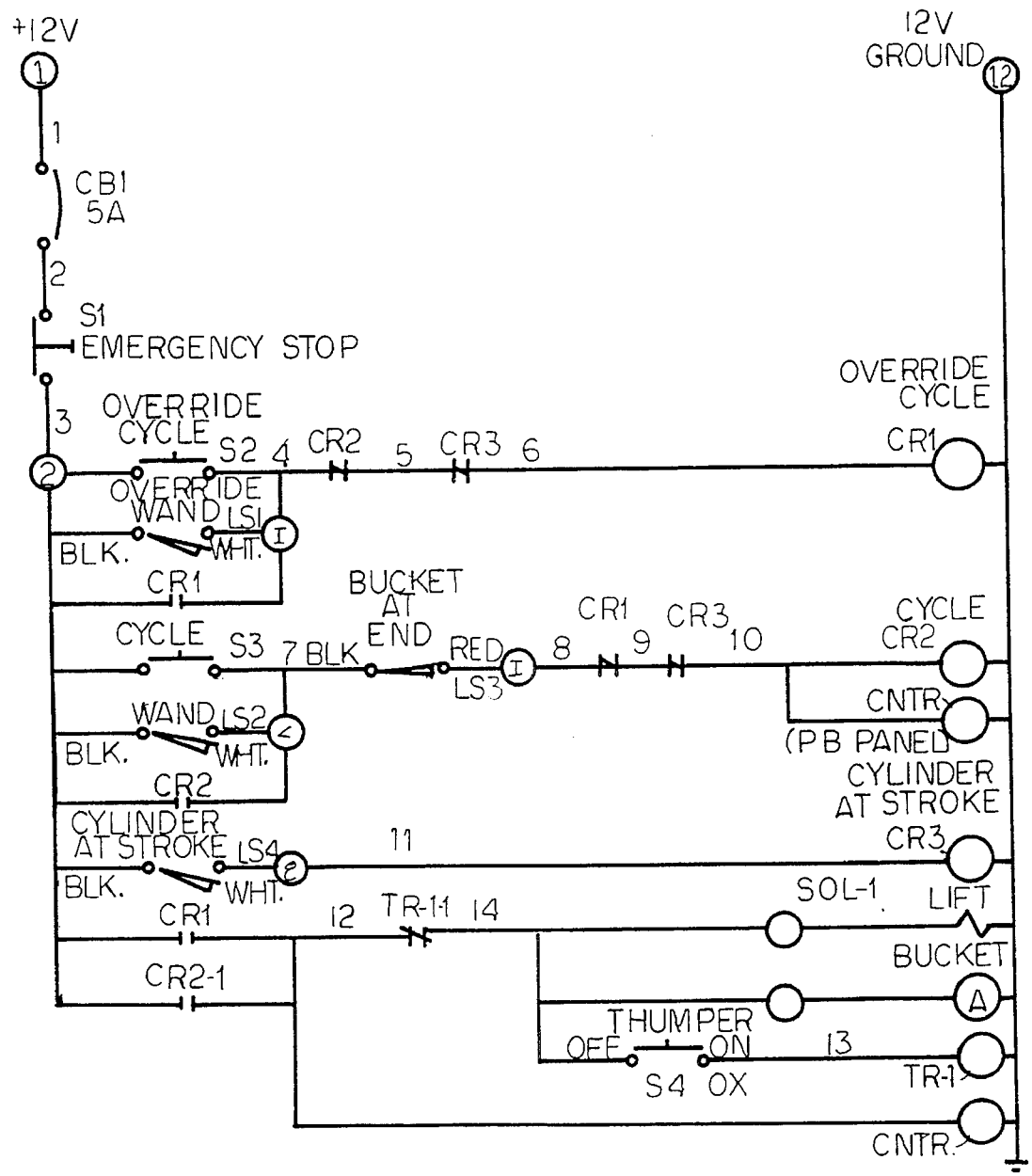
FIG. 15 is a schematic electrical control diagram used in the soil separating apparatus of the present invention.

FIG. 14A shows a generic view of the feeding process. The feeder assembly rises for a period sufficient to add momentum to the soil, and then stops to thump the soil. Subsequently, that cycle is repeated, until the limit of rise is reached. The feeder assembly is then lowered.

FIG. 14B shows a "drop-back" version of the process. In the "drop-back" version, each interruption actually causes a quick but short drop in the feeder assembly. Ideally, the interruption is so short that the feeder assembly restarts its upward movement as the soil loses its momentum and unweighting, and as the soil starts to fall, this results in a collision between the rising feeder assembly and the "falling" soil which imposes a very deconsolidating shock to the soil. Fortunately, this "drop-back" action occurs naturally when the interrupt is caused by the same solenoid valve that is used to allow lowering of the feeding assembly at the end of the cycle. This allows full diversion of the pumped fluid and rapid draining of the hydraulic cylinders. This results in lowering of the feed apparatus. Because, in the preferred embodiment, the same solenoid valve (SOL-1) line is used in the interrupt cycles, the interruption causes a short deenergization of the solenoid valve (SOL-1) and therefore a short "drop-back" of the hopper body during each interruption.

During the course of one typical cycle, the front end bucket loader would empty its entire contents of unscreened material into the material feeder in one motion with no delay or waiting period. Upon withdrawing from the vibratory material separating apparatus the loader bucket would activate the mechanical trigger which would initiate the sequence of events that result in the feeder apparatus being pivoted or lifted by the hydraulic cylinders. More specifically, the bucket closes cycle wand limit switch LS2 which energizes control relay CR2, which closes switch CR2-1. That energizes solenoid SOL-1 which closes solenoid valve SV-1, so that diversion flow through adjustable vane AV-2, solenoid valve SV-1, and to the tank T stops. This causes the hopper body 28 to rise, or, more precisely, to increase its elevation angle.

The closing of switch CR2-1 also starts the timer TR-1. This, of course, assumes that the interruption system of the present invention has been placed on-line by closing interruption system switch S4.

The timer TR-1 counts out a rise period. During the rise period the hopper body 28 rises as a result of hydraulic pump P forcing hydraulic fluid through hydraulic lines to the hydraulic cylinders 46. At the end of the rise period, the timer TR-1 opens timer switch TR-1-1, which deenergizes the solenoid SOL-1, and opens solenoid vane SV-1. This causes high volume diversion of the hydraulic fluid to the tank T. If the diversion rate is lower than the pump rate, the rise of the hopper body slows. If the diversion rate is equal to the pump rate, the rise of the hopper body stops, because the cylinders do not drain. That is the cycle shown in FIG. 14A. If the diversion is greater than the pump rate, then the cylinders drain and the hopper body falls. This is the cycle shown in FIG. 14B.

From the end of the rise period, the timer T-1 is the period during which the interruption of the tilting of the hopper body occurs. At the end of the interruption period, the timer T-1 closes switch TR-1-1, which energizes solenoid SOL-1, closes solenoid valve SV-1, and stops the fluid diversion. This causes the action of the cylinders 46 to begin again and the hopper body to begin to rise again. This interruption cycle occurs many times as the hopper body moves along its rise path.

If this process is viewed from the hopper and soil point of view, as the feeder assembly, heaped with unscreened material, begins to pivot, the angle between the floor of the feeder assembly and the screening surface gradually increase. This steeper angle of the feeder assembly floor beneath the unscreened material offers less support and allows the material to overcome the friction that holds the material in the feeder thereby creating the potential for the unscreened material to flow out of the feeder assembly onto the screening surface. With the improved method recited herein, the past problems experienced due to moisture content and inconsistent composition of the unscreened material are overcome by the inertial effects caused by the interruptions or thumping of the feeder by the hydraulic cylinders which occurs at a specific duration and frequency throughout the pivoting travel of the feeder assembly during each loading and unloading cycle. The result is the delivery of a portion of each load of unscreened material onto the screening surface occurring at each thump during the entire feeder travel cycle. The continuous upward rotation of the feeder in conjunction with the repeated thumping action insures that a replenished volume of unscreened material is moved towards the lip of the feeder after each thump, ready to be deposited onto the screening surface throughout the cycle. This method insures an incremental feeding of unscreened material onto the screening surface by overcoming the influence of friction and by utilizing the inertial energy present in the unscreened material in the moving feeder assembly.

This method employs components that already exists on the equipment with the exception of the two adjustable timer functions (which can be present in a single time device TR-1, or can be two separate devices) and does not require other expensive or complicated hydraulic components such as vibrators or large secondary pumps (all of which require additional horsepower) or any of the additional plumbing that would be necessary. The incorporation of the two adjustable timer functions represents a minimal cost. However, the impact on the performance of a material feeder system is significant in comparison to any existing method.

It will be understood by those skilled in the art of controls that the interruption system which is the subject of the present invention could be implemented in many other ways. It is intended that this patent should cover all alternative methods.

What is claimed is:

1. A material feeder of the type for use above an associated material separating apparatus and adapted to feed, over a time period, material onto the associated material separating apparatus, said material feeder assembly having:

a) a hopper body having a first end and a second end, said hopper body being pivotably mounted at said first end on the associated material separating apparatus and pivotable from a first material loading position, wherein the material may be loaded into said hopper body, to a second material discharging position, wherein said hopper body is angled with respect to the material separating apparatus and the associated material is discharged from said hopper body onto the associated material separating apparatus; and b) tilting means to tilt said hopper body from said first position to said second position at a controlled rate of tilting, which tilt means includes:

i) hydraulic cylinder means operated by hydraulic fluid to effect movement of said hopper body between said first and second position;

ii) hydraulic fluid reservoir to provide hydraulic fluid to said hydraulic cylinder means;

iii) hydraulic fluid pump to direct hydraulic fluid from said hydraulic fluid reservoir into said hydraulic cylinder means to effect movement of said hopper body from said first to said second position;

iv) control module means to direct said hydraulic fluid on receipt of a signal to move said hopper body from said first to said second position, and to return said hopper body from said second position rapidly to said first position, thereby providing for the controlled feeding of said material onto the associated material separating apparatus, the improvement which comprises:

an interruption means to interrupt temporarily and abruptly a plurality of times the rate of tilting of said hopper body during the time that said hopper body is moving from said first position to said second position, said interruption means to provide for the gradual incremental discharge of the material from said hopper body onto the associated material separating apparatus on each interruption by an abrupt change in inertial forces on the material during said interruption of the rate of tilting of said hopper body, which interruption means comprises:

a first timer means to interrupt said flow of hydraulic fluid to said hydraulic cylinder means and to divert said hydraulic fluid back to said hydraulic fluid reservoir to cause a brief selected, timed cessation of hydraulic fluid flow to said hydraulic cylinder means and a change in inertial forces on said hopper body and the material thereon; and second timer means to control the frequency of said interruption periods of said first timer means to secure the gradual incremental discharge of material from said hopper body with each frequency of interruption.

2. The feeder of claim 1 wherein said first timer means provides said interruption periods to occur on a plurality of generally selected uniform time periods during the time that said hopper body is moved between said first position and said second position.

3. The feeder of claim 1 wherein said second timer means provides for a plurality of generally uniform frequency time periods.

4. The feeder of claim 1 wherein said first timer means causes an abrupt slowing or brief stopping of the rate of tilting of said hopper body.

5. The feeder of claim 1 wherein said interruption means provides for an abrupt stopping and brief reversing of said rate of tilting-of said hopper body.

6. The feeder of claim 1 wherein the hopper body is free of separate, extended vibration means to aid in the discharge of material.

7. The feeder of claim 1 wherein said first timer means includes an electrical solenoid valve means to divert hydraulic fluid back to said hydraulic fluid reservoir for said interruption time period.

8. The feeder of claim 1 wherein said first timer means provides for an interruption time period of between about 0.0025 second and about 1.0 second.

9. The feeder of claim 1 wherein said second timer means provides successive frequency time periods between interruption time periods of from about 1.0 second to about 3.0 minutes.

10. The feeder of claim 1 wherein said tilting means includes a trigger means, said trigger means being adapted so that, when activated after loading of the material, said trigger means causes said tilting means to start to tilt said hopper body after a selected time period.

11. The feeder of claim 10 wherein the trigger means includes an elongated wand extending from the feeder, which wand, on displacement by a material payloader, activates the hydraulic module control means.

12. In combination, a material separating apparatus for the separation of material and said feeder of claim 29.

13. A material feeder of the type for use above an associated soil material separating apparatus and adapted to feed, over a time period, material onto the associated material separating apparatus, said material feeder assembly having:
   a) a hopper body having a first end and a second end, said hopper body being pivotably mounted at said first end on the associated material separating apparatus and pivotable from a first material loading position, wherein the material may be loaded into said hopper body, to a second material discharging position, wherein said hopper body is angled with respect to the material separating apparatus and the associated material is discharged from said hopper body onto the associated material separating apparatus;
   b) tilting means to tilt said hopper body from said first position to said second position at a controlled rate of tilting, thereby providing for the controlled feeding of the material onto the associated material separating apparatus, and to return said hopper body rapidly to said first position; which tilting means includes a hydraulic cylinder means having hydraulic fluid to cause the movement of said hopper body between said first and second position, the improvement which comprises:
      an interruption means to interrupt, temporarily and abruptly, by slowing, stopping or reversing, the rate of tilting of said hopper body during the time that said hopper body is moving from said first position to said second position, said interruption means allowing for the gradual incremental discharge of the soil material from said hopper body onto said associated soil material separating apparatus on each abrupt and temporary interruption, said interruption means being adapted to cause the interruption to occur on a plurality of selected generally uniform occasions during the time that said hopper body is moved between said first position and said second position, for a plurality of selected, generally uniform interruption time periods, and which interruption means comprises;
      i) a hydraulic diversion means, including a solenoid valve, to divert hydraulic fluid from said hydraulic means for a selected interruption time period;
      ii) a first timer means to cause said solenoid valve to divert hydraulic fluid from said cylinder for one or more selected fluid interruption time periods of from about 0.0025 second to about 1.0 second; and
      iii) a second timer means to control the frequency of the time between interruption periods ranging from about 1.0 second to 3.0 minutes.

14. In combination, a soil material separating apparatus for the separation of soil material into coarse soil material and a fine soil material and having an angularly disposed vibrating surface, and said feeder of claim 10 above the soil material separating apparatus to discharge soil material onto the surface.

15. In a method for feeding material onto an associated material separating apparatus in a controlled manner, comprising the steps of:
   a) providing a hopper body having a first end and a second end, said hopper body being pivotably mounted at said first end on the associated material separating apparatus and adapted to move between a first material loading position and a second material discharging position;
   b) positioning said hopper body in a first material loading position above the associated material separating apparatus;
   c) loading material into said hopper body in said first position;
   d) tilting said hopper body at a controlled rate of tilting between said first loading position and a second material discharging position, wherein said second end of said hopper body is above and spaced apart from the associated material separating apparatus to discharge the loaded material from said hopper body onto the associated material separating apparatus; and
   e) returning said hopper body after discharge of the material loaded, to said first position, the improvement which comprises:
      interrupting the rate of tilting of said hopper body with loaded material from said first to said second position a plurality of times for selected brief and temporary interruption time periods and for a plurality of selected frequency of interruption time periods, to provide for an abrupt and temporary change in inertial forces on said hopper body and the loaded material, which change in inertial forces permits the gradual incremental discharge of the loaded material from said hopper body generally at each interruption without the necessity of employing separate vibrating means.

16. The method of claim 15 which includes the selecting of interruption time periods of between about 0.0025 second and about 1.0 second.

17. The method of claim 15 which includes sensing the presence of a material load bearing means to provide loaded material to said hopper body in said first position and providing for the delayed timed operation of said hopper body between said first and second positions after such sensing.

18. The method of claim 15 which includes interrupting the rate of tilting of said hopper body from said first to said second positions at and for generally uniform interruption time periods and frequency time periods.

19. The method of claim 15 which includes employing hydraulic fluid means to affect said tilting of said hopper body between said first and second positions and employing a first timer means to divert hydraulic fluid for a selected time interruption period and a second timer means to provide for selected interruption time period frequencies.

20. The method of claim 15 which includes employing an electrical solenoid valve, which in response to electrical signals from the timer means, diverts hydraulic fluid for said interruption time periods.

21. The method of claim 15 which includes interrupting at a frequency of between about 1.0 second and about 3.0 minutes.

22. The method of claim 15 which includes interrupting at a rate of about from three to thirty times during movement of said hopper body from said first position to said second position.

23. The method of claim 15 which includes interrupting for time periods ranging from about 0.0025 seconds to 1.0 seconds.

24. The method of claim 15 wherein said material comprises a particulate soil material.

25. The method of claim 15 which includes gradually and incrementally discharging all the loaded material from said hopper body as it moves from said first to said second-position onto a vibrating angular material separating surface on an associated material separating apparatus, for separation of the material into a coarse material and a fine material.

26. The method of claim 15 which includes employing trigger means, and on activating said trigger means, after loading the material into the hopper in said first position, starting the rate of tilting of said hopper.

27. The method of claim 26 wherein said trigger means includes an elongated wand extending from the associated material separating apparatus, and which includes activating said trigger means by striking said wand with the bucket of a material bearing vehicle after loading of said material into said hopper body in a first position.

* * * * *

UNITED STATES PATENT AND TRADEMARK OFFICE
CERTIFICATE OF CORRECTION

PATENT NO. : 5,501,343
DATED : March 26, 1996
INVENTOR(S) : Robert J. Hadden

It is certified that error appears in the above-indentified patent and that said Letters Patent is hereby corrected as shown below:

In the claims: Claim 20.

Column 16, line 44, after "claim" delete "15" and insert --19--

Signed and Sealed this

Twenty-fifth Day of June, 1996

*Attest:*

BRUCE LEHMAN

*Attesting Officer*    *Commissioner of Patents and Trademarks*